(12) United States Patent
Creeth et al.

(10) Patent No.: US 8,603,684 B2
(45) Date of Patent: Dec. 10, 2013

(54) FUEL CELLS

(75) Inventors: Andrew Martin Creeth, Chester (GB); Emma Farndon, Loughborough (GB)

(73) Assignee: Acal Energy Limited, Runcorn, Cheshire (GB)

( * ) Notice: Subject to any disclaimer, the term of this patent is extended or adjusted under 35 U.S.C. 154(b) by 606 days.

(21) Appl. No.: 12/679,478

(22) PCT Filed: Sep. 22, 2008

(86) PCT No.: PCT/GB2008/050848
§ 371 (c)(1),
(2), (4) Date: Nov. 4, 2010

(87) PCT Pub. No.: WO2009/037513
PCT Pub. Date: Mar. 26, 2009

(65) Prior Publication Data
US 2011/0039170 A1    Feb. 17, 2011

(30) Foreign Application Priority Data

Sep. 20, 2007 (GB) .................................. 0718349.4

(51) Int. Cl.
*H01M 8/18* (2006.01)
(52) U.S. Cl.
USPC ............................ 429/417; 429/400; 429/443
(58) Field of Classification Search
USPC .......................................... 429/400, 417, 443
See application file for complete search history.

(56) References Cited

U.S. PATENT DOCUMENTS

| | | |
|---|---|---|
| 3,152,013 A | 10/1964 | Juda |
| 3,279,949 A | 10/1966 | Schaefer et al. |
| 3,294,588 A | 12/1966 | Beltzer et al. |
| 3,360,401 A | 12/1967 | Grasselli et al. |
| 3,540,933 A | 11/1970 | Boeke |
| 3,607,420 A | 9/1971 | Cutler |
| 4,048,383 A | 9/1977 | Clifford |
| 4,396,687 A | 8/1983 | Kummer et al. |

(Continued)

FOREIGN PATENT DOCUMENTS

| | | |
|---|---|---|
| EP | 0 043 647 | 1/1982 |
| EP | 0 228 168 | 11/1986 |

(Continued)

OTHER PUBLICATIONS

S.R. Alley and W. Henderson, "Synthesis and characterization of ferrocenyl-phosphonic and -arsonic acids," J. Organomet. Chem., 637-639, 2001, 216-229.

(Continued)

*Primary Examiner* — Jane Rhee
(74) *Attorney, Agent, or Firm* — Knobbe Martens Olson & Bear LLP

(57) ABSTRACT

The present invention concerns a fuel cell comprising a cathode in a cathode region of the cell and an anode in an anode region of the cell, the cathode being separated from the anode by an ion selective polymer electrolyte membrane, the cathode region of the cell being supplied in use thereof with an oxidant and a liquid low molecular weight fuel wherein at least some of the liquid low molecular weight fuel in use crosses the polymer electrolyte membrane to supply the anode region of the cell with liquid low molecular weight fuel, the cell being provided with means for generating an electrical circuit between the cathode and the anode.

19 Claims, 3 Drawing Sheets

(56) References Cited

U.S. PATENT DOCUMENTS

| | | | |
|---|---|---|---|
| 5,250,158 A | 10/1993 | Kaneko et al. | |
| 5,298,343 A | 3/1994 | Savadogo et al. | |
| 5,660,940 A | 8/1997 | Ragnar et al. | |
| 5,683,829 A | 11/1997 | Sarangapani | |
| 5,958,616 A | 9/1999 | Salinas et al. | |
| 6,054,580 A | 4/2000 | Collins et al. | |
| 2001/0028977 A1 | 10/2001 | Kazacos et al. | |
| 2003/0152823 A1 | 8/2003 | Heller | |
| 2004/0028203 A1 | 2/2004 | Wurster et al. | |
| 2004/0028992 A1 | 2/2004 | Jaouen | |
| 2004/0137297 A1 | 7/2004 | Matsuoka et al. | |
| 2005/0074653 A1 | 4/2005 | Broman | |
| 2005/0112055 A1 | 5/2005 | Shannon et al. | |
| 2005/0158618 A1 | 7/2005 | Liberatore et al. | |
| 2005/0244707 A1 | 11/2005 | Skyllas-Kazacos et al. | |
| 2006/0012637 A1 | 1/2006 | Furukawa et al. | |
| 2006/0024539 A1* | 2/2006 | Dumesic et al. | 429/17 |
| 2006/0088750 A1 | 4/2006 | Nobuta | |
| 2006/0134493 A1 | 6/2006 | Yoshida et al. | |
| 2006/0216565 A1 | 9/2006 | Cooray et al. | |
| 2007/0078052 A1 | 4/2007 | Grinberg et al. | |
| 2007/0122689 A1 | 5/2007 | Kubo et al. | |
| 2007/0131546 A1 | 6/2007 | Nomoto et al. | |
| 2008/0274385 A1 | 11/2008 | Creeth | |
| 2009/0308752 A1 | 12/2009 | Evans et al. | |
| 2009/0317668 A1 | 12/2009 | Creeth et al. | |
| 2009/0325002 A1 | 12/2009 | Creeth et al. | |
| 2010/0112388 A1 | 5/2010 | Creeth et al. | |
| 2010/0112393 A1 | 5/2010 | Creeth et al. | |
| 2010/0297522 A1 | 11/2010 | Creeth et al. | |
| 2011/0014532 A1 | 1/2011 | Knuckey et al. | |
| 2011/0027671 A1 | 2/2011 | Knuckey et al. | |
| 2011/0091746 A1 | 4/2011 | Knuckey et al. | |

FOREIGN PATENT DOCUMENTS

| | | |
|---|---|---|
| EP | 0 517 217 | 12/1992 |
| EP | 0 595 688 | 10/1993 |
| EP | 0 592 988 | 4/1994 |
| EP | 0 878 850 | 5/1998 |
| EP | 1 143 546 | 10/2001 |
| GB | 1 176 632 | 1/1970 |
| GB | 1 176 633 | 1/1970 |
| GB | 2 400 974 | 10/2004 |
| GB | 0505087.7 | 3/2005 |
| GB | 2 424 118 | 3/2006 |
| GB | 0605878.8 | 3/2006 |
| GB | 0608079.0 | 4/2006 |
| GB | 0614337.4 | 7/2006 |
| GB | 0614338.2 | 7/2006 |
| GB | 0718349.4 | 9/2007 |
| GB | 0718577.0 | 9/2007 |
| GB | 2 440 434 | 1/2008 |
| GB | 2 440 435 | 1/2008 |
| GB | 0801195.9 | 1/2008 |
| GB | 0801198.3 | 1/2008 |
| GB | 0801199.1 | 1/2008 |
| GB | 0907795.9 | 5/2009 |
| GB | 2 440 489 | 10/2009 |
| JP | 56 042970 | 4/1981 |
| JP | 61 054163 | 3/1986 |
| JP | 62 015770 | 1/1987 |
| JP | 05-295578 | 11/1993 |
| JP | 11-288727 | 10/1999 |
| JP | 2004 319292 | 11/2004 |
| RU | 2004129396 | 3/2006 |
| WO | WO 91/13681 | 9/1991 |
| WO | WO 96/31912 | 10/1996 |
| WO | WO 00/12667 | 3/2000 |
| WO | WO 00/22688 | 4/2000 |
| WO | WO 00/29537 | 5/2000 |
| WO | WO 01/73881 | 10/2001 |
| WO | WO 03/083967 | 10/2003 |
| WO | WO 2005/112055 | 11/2005 |
| WO | WO 2006/012637 | 2/2006 |
| WO | WO 2006/057387 | 6/2006 |
| WO | WO 2006/097438 | 9/2006 |
| WO | WO 2006/121191 | 11/2006 |
| WO | WO 2007/101284 | 9/2007 |
| WO | WO 2007/110663 | 10/2007 |
| WO | WO 2007/122431 | 11/2007 |
| WO | WO 2008/009992 | 1/2008 |
| WO | WO 2008/009993 | 1/2008 |
| WO | WO 2009/037513 | 3/2009 |
| WO | WO 2009/040577 | 4/2009 |
| WO | WO 2009/093080 | 7/2009 |
| WO | WO 2009/093081 | 7/2009 |
| WO | WO 2009/093082 | 7/2009 |
| WO | WO 2010/128333 | 11/2010 |

OTHER PUBLICATIONS

I. Bernal et al., "Iron(II) Complexes of polydentate Aminopyridyl Ligands and an Exchangeable Sixth Ligand; Reactions with peroxides . . . " J. Chem. Soc., Dalton. Trans., 1995, 3667-3675.

J. Chang, et al., "Synthesis and Characterization of Bis(d-2-pyridylmethanamine)ruthernium(II)," Inorg. Chem. 2004, 43, 1735-1742.

R. Dillon, S. Sriinivasan, A.S. Arico, V. Antonucci, "International Activities in DMFC R&D: status of technologies and potential applications," J. Power Sources, 127, 2004, 112-126.

W. R. Harris et al., "Chelating Tendencies of Pyridyl Containing Polyamines and Oxygenation of the Cobaltous Complexes," Inorg. Chem., 1978, 17, 889-894.

A. Heinzel, V.M. Barragan, "A review of the state-of-the-art of the methanol crossover in direct methanol fuel cells," J. Power Sources, 84, 1999, 70-74.

M.P. Hogarth, T.R. Ralph, "Catalysis for Low Temperature Fuel Cells," Platinum Metal Reviews, 46, 2002, 146-164.

M. Klopstra, R. Hage, R.M. Kellogg and B.L. Feringa, "Non-heme iron catalysts for the benzylic oxidation: a parallel ligand screening approach," Tet. Lett. 44, 2003, 4581-4584.

G.R. Knox and P.L. Pauson, "Ferrocene Derivatives, Part VII. Some Sulphur derivatives," J. Chem. Soc., 1958, 682.

Limoges, B.R. et al. "Electrocatalyst materials for fuel cells based on the polyoxometalates $[PMo(12-n)Vn040]<(3+n)\rightarrow(n=0-3)$", Electrochimica Acta, Elsevier Scient Publishers, Barking, GB, vol. 50, No. 5, Jan. 15, 2005 pp. 1169, 1170, 1176-1179.

M. Lubben et al., "Nonheme Iron Centers in Oxygen Activation: Characterization of an Iron(III) Hydroperoxide Intermediate," Angew. Chem. Int. Ed. Engl., 34, 1995, 1512-1514.

D. L. Reger et al. , "Synthesis and structural characterization of the bitopic ferrocene-based tris(pyrazolyl)methane ligand Fe[C5H4CH2OCH2C(pz)3]2 (pz=pyrazolyl ring)" J. Chem. Crystallography, 35, 2005, 217-225.

H. Sato et al., "Convenient Synthesis of N,N,N',N'-Tetrakis(2-pyridylmethyl)-α,ω-alkanediamines Using a Phase-Transfer Catalyst," Synthesis, 1992, 539-540.

M. Tamura et al., "Superoxide Dismutase Activity of Iron(II) TPEN complex and Its Derivatives," Chem. Pharm. Bull., 48, 2000, 1514-1518.

M. Van den Heuval et al., "Synthesis of a Non-Heme Template for Attaching Four Peptides: An Approach to Artificial Iron(II)-Containing Peroxidases," J. Organ. Chem., 69, 2004, 250-262.

V. Neburchilov, J. Martin, H. Wang, J. Zhang, "A Review of Polymer Electrolyte Membranes for Direct Methanol Fuel Cells," Journal of Power Sources, 2007, vol. 169, pp. 221-238.

J.G. Roelfes, "Models for Non-Heme Iron Containing Oxidation Enzymes," Jun. 4, 1972, pp. 1-154.

* cited by examiner

FUEL CELLS

CROSS-REFERENCE TO RELATED APPLICATIONS

This Application is the US National Phase under 35 U.S.C. §371 of International Application No. PCT/GB2008/050848, filed Sep. 22, 2008, which was published in English as International Publication No. WO 2009/037513 on Mar. 26, 2009, and claims the benefit of GB 0718349.4, filed Sep. 20, 2007.

BACKGROUND

1. Field

The present invention relates to fuel cells, in particular to fuel cells in operation of which an alcohol or other low molecular weight fuel is supplied as fuel to the anode region of the cell. Such cells have applications in microfuel cells for electronic and portable electronic components, and also in larger fuel cells for portable and stationary power and the automotive industry.

2. Description of the Related Art

A fuel cell is an electrochemical energy conversion device that converts fuel and oxidant into reaction products, producing electricity and heat in the process. In one example of such a cell, methanol is used as fuel, and air or oxygen as oxidant, and the products of the reaction are carbon dioxide and water. The electrochemical reactions in this cell in operation may be summarised as follows:

| Anode | $CH_3OH + H_2O$ | $\leftrightarrows$ | $CO_2 + 6H^+ + 6e^-$ |
|---|---|---|---|
| Cathode | $\tfrac{3}{2}O_2 + 6H^+ + 6e^-$ | $\leftrightarrows$ | $3H_2O$ |
| Overall | $CH_3OH + \tfrac{3}{2}O_2$ | $\leftrightarrows$ | $CO_2 + 2H_2O$ |

The methanol fuel and oxidant are fed respectively into catalysing, diffusion-type electrodes separated by an electrolytic membrane which allows the passage of protons from the anode chamber to the cathode chamber to balance the cathode reaction. The electrons generated in the anode chamber flow in an external electrical circuit and are returned to the cathode having provided the power output from the cell. Such fuel cells are known as direct methanol fuel cells (DMFCs).

Direct Methanol Fuel Cells (DMFCs) are extremely useful as they can transform fuel into electricity at a scale that is difficult for other technologies such as the internal combustion engine. The fuel, methanol, is readily transportable and has a high energy density, making DMFCs attractive for use in portable applications and as replacement batteries in portable electronic devices.

Various types of membrane may be used, such as polymer electrolyte membranes (PEMs), comprising for example Nafion™. Fuel cells based on polymer electrolyte membranes (PEM fuel cells) are convenient for portable applications such as portable electronics and automotive technology due to their relatively low temperatures of operation. Further or alternative adaptations to the PEM barrier include the provision of a bimembrane as described in our co-pending application PCT/EP2006/060640.

US-A-2004/0137297 discloses an ion exchange membrane said to be useful for the diaphragm of a direct methanol type fuel cell.

Methanol and other low molecular weight alcohols are convenient fuels for portable fuel cells because their energy density is relatively high, eg, for methanol, six moles of electrons being generated in the electrochemical half cell for every mole of fuel consumed. However, DMFCs typically suffer from crossover effects—methanol is transported across the membrane by diffusion and electro-osmosis. This causes a reduction in the performance of the fuel cell by the effect of methanol being oxidized at the cathode, typically comprising Pt or other noble metal catalyst. Here the methanol is oxidized at the potentials of oxygen reduction. The potential and current are reduced, causing a loss in power density; the open circuit potential is also reduced.

Conventionally, routes to reduce the methanol crossover effect have included:

i) Increasing the membrane thickness—typically 170 μm Nafion is used instead of the more common 50 μm membrane for hydrogen fuel cells. This increases the resistance of the membrane—whilst not completely eliminating the crossover impact.

ii) Introducing layers to restrict methanol crossover within the MEA iii) Using an alternative membrane to the Nafion-type sulphonated fluoropolymer. Usually these membranes require higher temperatures (>100° C.) to operate effectively, or conduct less well or swell.

iv) Using selective catalysts for the cathode. These are generally poorer catalysts for oxygen reduction than noble metal-containing catalysts such as Pt and Pt-containing catalysts.

The phenomenon of methanol crossover and potential solutions have been reviewed recently:

International activities in DMFC R&D: status of technologies and potential applications, R Dillon, S Sriinivasan, A S Arico, V Antonucci, J Power Sources, 127, 112 (2004).

M P Hogarth, T R Ralph, Platinum Metal Reviews, 46, 146 (2002).

A Heinzel, V M Barragan, J Power Sources, 84,70 (1999).

V Neburchilov, J Martin, H Wang & J Zhang, J Power Sources, 169, 221 (2007)

Routes using selective catalysts include the mixed reactant route. For instance, compact mixed reactant (CMR) fuel cells use selective electrode catalysts, and have porous membranes to pass the reactants through the membrane electrode assembly (MEA). In International Patent Application No. WO01/73881 a mixed reactant system is disclosed which includes porous electrodes and electrolyte (if not formed by the reaction mixture). In this arrangement, it is an essential feature that the mixed reactants are exposed to both electrodes. A further example of a mixed reactant system is disclosed in US2004/058203.

In addition to methanol crossover, a further problem suffered by DMFCs is water crossover, where water crosses the polymer electrolyte membrane from the anode to the cathode with methanol.

The methanol and water cross the membrane because of osmotic drag. As protons flow through the membrane they 'pull' water and methanol molecules with them.

Conventionally, DMFCs operate using a dilute methanol fuel, typically 1M. This solution is used to protect the MEA, to provide water as fuel for the anode reaction and also to limit the amount of methanol so as to reduce methanol crossover.

However, approximately three molecules cross the membrane per is molecule of methanol. As a result, the methanol concentration in the anolyte will become progressively stronger. To prevent this happening, the water which crosses through the membrane must be returned to the anode to maintain the dilution of the methanol. This requires:

i) the collection of the liquid water and pumping to return it,
ii) or a membrane to restrict the movement of liquid water and provide a pressure to return it to the anode, which reduces performance,
iii) or evaporation of the water, followed by condensation and return to the anolyte. To evaporate the water requires heat and limits the efficiency of the cell.

Maintaining the anolyte at a 1M concentration requires a control system including apparatus in which pure methanol is fed (using a first pump) to an anolyte mixer where it is mixed with water to form the 1M anolyte. The 1M anolyte is then recirculated (using a second pump) to the anode. In practice, a gas/liquid separation system will also be required.

SUMMARY

It is an object of the present invention to provide an improved alcohol (or other liquid low molecular weight fuel)-fuelled fuel cell. In particular, it is intended to overcome or ameliorate one or more of the aforesaid disadvantages caused by crossover of the fuel and/or water across the membrane separating the anode from the cathode without increasing membrane thickness or using a complex and/or costly membrane electrode assembly. It is a more specific object of the invention to reduce or eliminate the need to include apparatus for collecting water that has crossed over and maintaining constant anolyte concentration.

According to the present invention there is provided a fuel cell comprising a cathode in a cathode region of the cell and an anode in an anode region of the cell, the cathode being separated from the anode by an ion selective polymer electrolyte membrane, the cathode region of the cell being supplied in use thereof with an oxidant and a liquid low molecular weight fuel wherein at least some of the liquid low molecular weight fuel in use crosses the polymer electrolyte membrane to supply the anode region of the cell with liquid low molecular weight fuel, the cell being provided with means for generating an electrical circuit between the cathode and the anode.

The liquid low molecular weight fuel is preferably an alcohol, such as methanol, ethanol, propanol, isopropanol and butanol, dipropylene glycol and ethylene glycol, and mixtures of two or more thereof; but other non-alcoholic fuels such as formic acid may also be envisaged. By low molecular weight is preferably meant that the fuel comprises no more than about 10, preferably no more than about 5, more preferably no more than about 4 and most preferably no more than about 3 carbon atoms at the molecular level. By liquid is preferably meant the physical state of the fuel under normal atmospheric conditions—that is, not necessarily the physical state of the fuel supplied to the cell. However, it is preferred that the fuel be supplied to the cell in the liquid state.

In the remainder of the text which follows, for the sake of simplicity emphasis will be placed on alcoholic fuels—particularly methanol—but it is to be understood that in all of the following text non-alcoholic fuels which are liquid and low molecular weight in nature—such as formic acid—are specifically contemplated as alternatives.

In some cases it will also be desirable to use suitable mixtures of fuels and this too is specifically contemplated.

A fuel cell in accordance with the present invention overcomes the problems known in the art. By providing the anode region of the cell with alcoholic fuel which passes through the membrane from the catholyte, i.e. by using the system that is already present in the cathode region of the cell, the system needed by conventional DMFCs to control anolyte to concentration can be dispensed with, allowing the cell to be more compact and less costly to produce and maintain.

Additionally, conventionally employed measures to limit methanol crossover, such as thicker membranes or complex membrane electrode assemblies are no longer required.

Although the problem of methanol crossover is well-known in the art, it will surprisingly be seen from the examples that follow that the presence of methanol in the cathode region of the cell of the present invention does not adversely affect cell performance.

Additionally, although the alcoholic fuel and the water have to travel through the membrane against the electroosmotic force generated by proton transport, effective currents are unexpectedly drawn from the cell of the present invention despite this drive in the opposite direction.

In a preferred embodiment of the present invention, the cathode region of the cell comprises a non-volatile redox couple in solution in flowing fluid communication with the cathode, the redox couple being at least partially reduced at the cathode in operation of the cell, and at least partially re-generated by reaction with the oxidant after such reduction at the cathode.

While the fuel cell of the present invention functions effectively in the absence of an anolyte, in a preferred embodiment, the anode region of the cell is supplied in use with water.

In operation, the fuel cell will usually provide electromotive force to some external mechanism (the drive shaft of an automobile or the processor of an electronic component, for example).

Suitable fuels include low molecular weight alcohols such as methanol, ethanol, propanol, isopropanol and butanol, dipropylene glycol and ethylene glycol.

Suitable oxidant gas materials include oxygen and air and hydrogen peroxide.

Preferably the anode electrode comprises a diffusion layer and an electrocatalyst layer. The diffusion layer is suitably of a graphitic nature, and the electrocatalyst layer is suitably of finely divided platinum or palladium. Platinum based alloys are also suitable for use, the alloy metal being suitably selected from tin, iridium, osmium, rhenium or ruthenium. Generally speaking, the choice of alloy depends on the fuel to be oxidised at the anode electrode. Platinum-ruthenium alloy anodes are preferable for electro-oxidation of methanol, for example.

The cathode in the redox fuel cell of the invention may comprise as cathodic material carbon, nickel, metal oxide, sulphide and/or selenide species. The cathodic material may be selected to promote catholyte mediator and/or catalyst oxygen reduction in favour of methanol oxidation. The cathodic material may be constructed from a fine dispersion of particulate cathodic material, the particulate dispersion being held together by a suitable adhesive, or simply by the proton conducting polymeric material. The cathode is designed to create maximum flow of redox mediator to the cathode surface. Thus it may consist of shaped flow regulators or a three dimensional electrode or both; the liquid flow may be managed in a flow-by arrangement where there is a liquid channel adjacent to the electrode, or in the case of the three dimensional electrode, where the liquid is forced to flow through the electrode. It is intended that the surface of the electrode is also the electrocatalyst, but it may be beneficial to adhere the electrocatalyst in the form of deposited particles on the surface of the electrode.

Transition metal ions, and complexes of transition metal ions form suitable redox couples for use in the fuel cell of the invention. Suitable transition metals include vanadium, molybdenum, iron, manganese and copper. One example of a suitable redox couple is the Ferrocene complex Alternatively or additionally, modified ferrocene complexes such as those to disclosed in UK Patent Application No. GB0714046.0, for example, species represented by the formula:

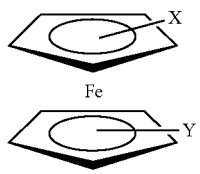

wherein:

X and Y are independently selected from hydrogen and from functional groups comprising halogen, hydroxy, amino, protonated amino, imino, nitro, cyano, acyl, acyloxy, sulphate, sulphonyl, sulphinyl, alkylamino, protonated alkylamino, quaternary alkylammonium, carboxy, carboxylic acid, ester, ether, amido, sulphonate, sulphonic acid, sulphonamide, phosphonic acid, phosphonate, phosphonic acid, phosphate, alkylsulphonyl, arylsulphonyl, alkoxycarbonyl, alkylsulphinyl, arylsulphinyl, alkylthio, arylthio, alkyl, alkoxy, oxyester, oxyamido, aryl, arylamino, aryloxy, heterocycloalkyl, heteroaryl, ($C_2$-$C_5$)alkenyl, ($C_2$-$C_5$)alkynyl, azido phenylsulphonyloxy or amino acid conjugates having the formula —CO—W—OH, where W is an amino acid, and from alkyl, alkenyl, aryl, cycloalkyl, alkaryl alkenaryl, aralkyl, aralkenyl groups substituted with one or more of the aforesaid functional groups.

Other examples include polyoxometallates, preferably the polyoxometallate species disclosed in PCT/GB2007/050151. In one fuel cell of the invention, the redox couple comprises a polyoxometallate species. In this case the catholyte solution preferably comprises at least about 0.1M of a polyoxometallate.

The polyoxometallate when used as the redox species may be represented by the formula:

$$X_a[Z_bM_cO_d]$$

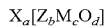
wherein:

X is selected from hydrogen, alkali metals, alkaline earth metals, ammonium and combinations of two or more thereof;

Z is selected from B, P, S, As, Si, Ge, Ni, Rh, Sn, Al, Cu, I, Br, F, Fe, Co, Cr, Zn, $H_2$, Te, Mn and Se and combinations of two or more thereof;

M is a metal selected from Mo, W, V, Nb, Ta, Mn, Fe, Co, Cr, Ni, Zn Rh, Ru, Tl, Al, Ga, In and other metals selected from the $1^{st}$, $2^{nd}$ and $3^{rd}$ transition metal series and the lanthanide series, and combinations of two or more thereof;

a is a number of X necessary to charge balance the [$M_cO_d$] anion;

b is from 0 to 20, more preferably 0-2;

c is from 1 to 40; and d is from 1 to 180.

Vanadium and molybdenum, and combinations thereof, are particularly preferred for M.

Phosphorus is particularly preferred for Z.

A combination of hydrogen and an alkali metal and/or alkaline earth metal is particularly preferred for X. One such preferred combination is hydrogen and sodium.

Specific examples of polyoxometallates include molybdophosphoric acid, $H_3PMo_{12}O_{40}$ and molybdovanadophosphoric acid, $H_5PMo_{10}V_2O_{40}$.

Thus, according to one aspect of the present invention, there is provided a fuel cell in accordance with the invention wherein the catholyte solution comprises a polyoxometallate catalyst in addition to alcoholic fuel. In a preferred embodiment of the present invention, the catalyst comprises vanadium. In a more preferred embodiment, the catalyst comprises vanadium and molybdenum. In a preferred embodiment of the present invention, the polyoxometallate comprises vanadium, more preferably vanadium and molybdenum. Thus, the catalyst may be $H_3Na_2PMo_{10}V_2O_{40}$. Alternatively, the catalyst may be $H_3Na_3PMo_9V_3O_{40}$ or $H_3Na_4PMo_8V_4O_{40}$ and compounds of intermediate composition In addition, a mixture of these or other polyoxometallate catalysts is also envisaged. For this embodiment, preferably, at least one X is hydrogen. However, it is also preferred that not all X be hydrogen. More preferably, at least two of X are not hydrogen. X comprising at least one hydrogen o and at least one other material selected from alkali metals, alkaline earth metals, ammonium and combinations of two or more thereof is preferred.

The concentration of the polyoxometallate in the catholyte solution is preferably at least about 0.1M, preferably at least about 0.15M, more preferably at least about 0.175M and most preferably at least about 0.2M.

Accordingly, in one aspect, the present invention provides a redox fuel cell comprising an cathode and an anode separated by an ion selective polymer electrolyte membrane; means for supplying an oxidant and an alcoholic fuel to the cathode region of the cell; wherein the alcoholic fuel in use crosses the polymer electrolyte membrane and supplies the anode with alcoholic fuel; means for providing an electrical circuit between the anode and the cathode; a solution containing non-volatile catholyte components flowing in fluid communication with the cathode, the catholyte solution comprising a redox couple being at least partially reduced at the cathode in operation of the cell, and at least partially re-generated by reaction with the oxidant after such reduction at the cathode, the catholyte solution comprising at least about 0.1M of the said redox couple.

In one preferred embodiment of the invention, the ion selective PEM is a cation selective membrane which is selective in favour of protons versus other cations yet still permits the passage of alcoholic fuel therethrough.

One of the advantages of the present invention is that the use of thin membranes is possible. Having said that, the cation selective polymer electrolyte membrane may be formed from any suitable material, but preferably comprises a polymeric substrate having cation exchange capability. Suitable examples include fluororesin-type ion exchange resins and non-fluororesin-type ion exchange resins. Fluororesin-type ion exchange resins include perfluorocarboxylic acid resins, perfluorosulfonic acid resins, and the like. Perfluorocarboxylic acid resins are preferred, for example "Nafion" (Du Pont Inc.), "Flemion" (Asahi Gas Ltd), "Aciplex" (Asahi Kasei Inc), and the like. Non-fluororesin-type ion exchange resins include polyvinylalcohols, polyalkylene oxides, styrene-divinylbenzene ion exchange resins, and the like, and metal salts thereof. Preferred non-fluororesin-type ion exchange resins include polyalkylene oxide-alkali metal salt complexes. These are obtainable by polymerizing an ethylene oxide oligomer in the presence of lithium chlorate or another alkali metal salt, for example. Other examples include phenolsulphonic acid, polystyrene sulphonic, polytriflurostyrene sulphonic, sulphonated triflurostyrene, sulphonated copolymers based on α,β,β-triflurostyrene monomer, radiation-grafted membranes. Non-fluorinated membranes include sulphonated poly(phenylquinoxalines), poly(2,6 diphenyl-4-phenylene oxide), poly(arylether sulphone), poly(2,6-diphenylenol); acid-doped polybenzimidazole, sulphonated polyimides; styrene/ethylene-butadiene/styrene triblock copolymers; partially sulphonated polyarylene ether sulphone; partially sulphonated polyether ether ketone (PEEK); and polybenzyl suphonic acid siloxane (PBSS).

In some cases it may be desirable for the ion selective polymer electrolyte membrane to comprise a bi-membrane. The bimembrane if present will generally comprise a first cation selective membrane and a second anion selective membrane. In this case the bimembrane may comprise an adjacent pairing of oppositely charge selective membranes. For example the bi-membrane may comprise at least two discrete membranes which may be placed side-by-side with an optional gap therebetween. Preferably the size of the gap, if any, is kept to a minimum in the redox cell of the invention. The use of a bi-membrane may be used in the redox fuel cell of the invention to maximise the potential of the cell, by maintaining the potential due to a pH drop between the anode and catholyte solution. Without being limited by theory, in order for this potential to be maintained in the membrane system, at some point in the system, protons must be the dominant charge transfer vehicle. A single cation-selective membrane may not achieve this to the same extent due to the free movement of other cations from the catholyte solution In the membrane.

In this case the cation selective membrane may be positioned on the cathode side of the bimembrane and the anion selective membrane may be positioned on the anode side of the bimembrane. In this case, the cation selective membrane is adapted to allow protons to pass through the membrane from the anode side to the cathode side thereof in operation of the cell. The anion selective membrane is adapted substantially to prevent cationic materials from passing therethrough from the cathode side to the anode side thereof, although in this case anionic materials may pass from the cathode side of the anionic-selective membrane to the anode side thereof, whereupon they may combine with protons passing through the membrane in the opposite direction. Preferably the anion selective membrane is selective for hydroxyl ions, and combination with protons therefore yields water as product.

In a second embodiment of the invention the cation selective membrane is positioned on the anode side of the bimembrane and the anion selective membrane is positioned on the cathode side of the bi-membrane. In this case, the cation selective membrane is adapted to allow protons to pass through the membrane from the anode side to the cathode side thereof in operation of the cell. In this case, anions can pass from the cathode side into the interstitial space of the bimembrane, and protons will pass from the anode side. It may be desirable in this case to provide means for flushing such protons and anionic materials from the interstitial space of the bimembrane. Such means may comprises one or more perforations in the cation selective membrane, allowing such flushing directly through the membrane. Alternatively means may be provided for channelling flushed materials around the cation selective membrane from the interstitial space to the cathode side of the said membrane.

According to another aspect of the present invention, there is provided a method of operating a proton exchange membrane fuel cell comprising the steps of:
a) supplying a catholyte comprising an alcoholic fuel and a non-volatile redox couple solution in an oxidised state to a cathode situated oppositely adjacent to the proton exchange membrane wherein the alcoholic fuel crosses the proton exchange membrane to supply the anode with alcoholic fuel;
b) forming $H^+$ ions by the oxidation of the alcoholic fuel at the anode situated adjacent to a proton exchange membrane; and
c) allowing the redox couple to become reduced upon contact with the cathode concomitantly with $H^+$ ions passing through the membrane to balance charge.

In a preferred embodiment, the catholyte is supplied from a catholyte reservoir.

The method may additionally comprise the step of:
d) passing the catholyte from the cathode to a reoxidation zone wherein the catalyst is reoxidised.

In this embodiment, the cell is cyclic and the redox couple in the cathode can be repeatedly oxidised and reduced without having to be replaced.

BRIEF DESCRIPTION OF THE DRAWINGS

The invention will now be more particularly described with reference to the following Figures and Examples, in which.

DETAILED DESCRIPTION

Figure 1:
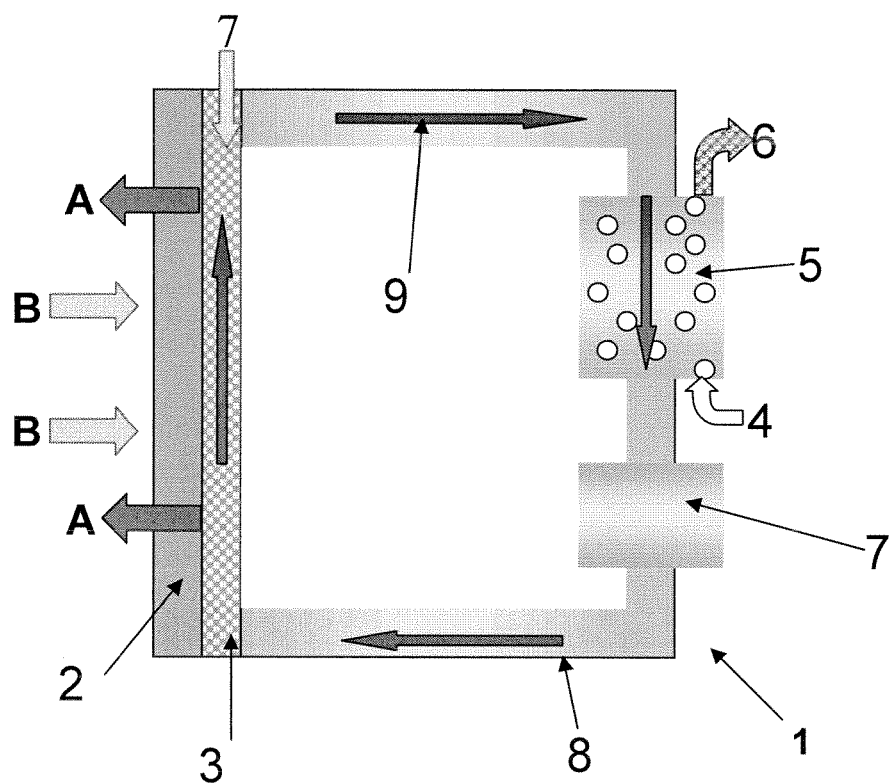
FIG. 1 shows a schematic diagram of a fuel cell constructed and arranged in accordance with the invention.

Referring to FIG. 1, there is shown the cathode side of fuel cell 1 in to accordance with the invention comprising a polymer electrolyte membrane 2 separating an anode (not shown) from cathode 3. Cathode 3 comprises in this diagram reticulated carbon and is therefore porous. However other porous materials such as carbon felts and similar carbon fibre-based systems, as well as porous metal foams and grids and metal particles and metal oxide particles deposited on these porous materials. Cathode 3 is free of platinum catalyst. Polymer electrolyte membrane 2 comprises cation selective Nafion 115 membrane through which alcoholic fuel (in this case methanol) present in the catholyte can pass (Arrow A) through the membrane 2 to supply the anode. Protons generated by the (optionally catalytic) oxidation of the methanol fuel in the anode chamber pass (Arrow B) in operation of the cell through membrane 2 to the cathode. Electrons generated at the anode by the oxidation of fuel gas flow in an electrical circuit (not shown) and are returned to cathode 3. In this advantageous arrangement no anolyte feed and no anolyte concentration control system are required making it compact and cost-effective. The oxidant (in this case air) is supplied to oxidant inlet 4 of cathode gas reaction chamber 5. Cathode gas reaction chamber 5 (the catalyst reoxidation zone) is provided with exhaust 6, through which the by-products of the fuel cell reaction (eg water and heat) can be discharged. The anode chamber is also provided with an exhaust for the carbon dioxide half reaction product in the anode region.

A catholyte solution comprising an alcoholic fuel and a catalyst and redox couple, in this case the oxidised form of the polyoxometallate, is supplied in operation of the cell from catholyte reservoir 7 into the cathode inlet channel 8. The catholyte passes into reticulated carbon cathode 3, which is situated adjacent membrane 2. As the catholyte passes through cathode 3, the polyoxometallate catalyst is reduced and is then returned to is cathode gas reaction chamber 5 via cathode outlet channel 9. At the same time, the alcoholic fuel passes through membrane 2 to supply the anode.

Due to the advantageous composition of the catholyte of the present invention, reoxidation of the catalyst occurs very rapidly, which allows the fuel cell to produce a higher sustainable current than with catholytes of the prior art.

At the anode, the following redox reaction occurs:

$$CH_3OH + H_2O \leftrightarrows CO_2 + 6H^+ + 6e^-$$

Electrons generated at the anode flow through the circuit, whilst protons generated at the first electrode flow through the gas diffusion substrate and through the polymer electrolyte membrane towards the cathode.

The fuel cell is provided with a reservoir 8 of a redox couple, which may be generally indicated as [R]. [R] may comprise for example a, a modified ferrocene complex or a polyoxometallate complex as hereinbefore described, or may be any other suitable redox couple. In operation of the cell the oxidised redox material is passed against the cathode and $[R]^{ox}$ ions are reduced to $[R]^{red}$ ions.

$$[R]^{ox} + ne^- \rightarrow [R]^{red}$$

Water is also liberated in the gas reaction chamber in accordance with the following equation:

$$(4/n)[R]^{red} + O_2 + 4H^+ \rightarrow (4/n)[R]^{ox} + 2H_2O$$

If peroxide is used as the oxidant instead of air or oxygen, then the reaction becomes:

$$(2/n)[R]^{red} + H_2O_2 + 2H^+ \rightarrow (2/n)[R]^{ox} + 2H_2O$$

The reservoir is supplied in normal use of the cell with an oxidant material (for example air).

EXAMPLE 1

Experiments were carried out in a 2.5×2.5 cm² graphite composite single cell. The anode flow field was parallel. The membrane electrode assembly (E-Tek series 12D-W ½) in these experiments comprised 100 pores per inch (ppi) reticulated vitreous carbon (RVC) at the cathode and Nafion 117 at the anode.

The membrane electrode assembly was conditioned in the fuel cell. Deionised water at room temperature water was flowed past the anode at a rate of 2 ml min⁻¹ for one hour.

1M methanol was added to 0.3M polyoxometallate (POM) and the solution was heated to 80° C. in the aerator. Room temperature deionised water was flowed passed the anode at rate of 2 ml min⁻¹, The POM/MeOH flow rate was set at 90 ml min⁻¹ and air flow was set at 0.5 l min⁻¹. Polarisation was obtained. The cathode temperature was recorded.

Figure 2:
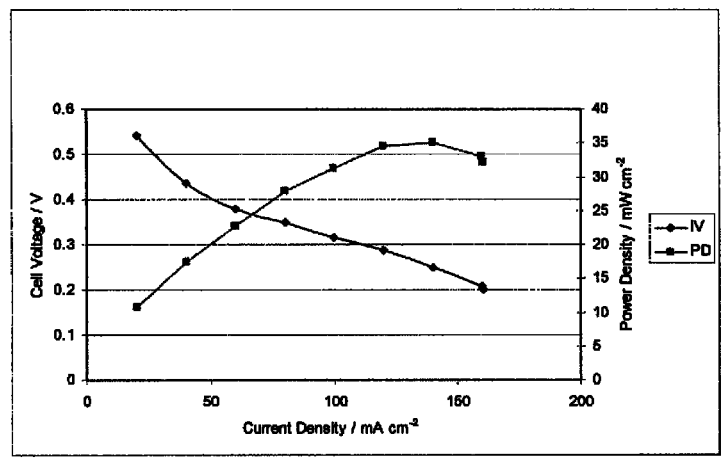
FIG. 2 shows the polarisation and power density curves of a fuel cell in accordance with the invention and described in Example 1 using 0.3M polyoxometallate (POM) containing 1M methanol (90 ml/min$^{-1}$) at 80° C. at the cathode and room temperature deionised water (2 ml/min$^{-1}$) at the anode.

FIG. 2 shows the current potential curve and power density data obtained for this system. The peak power obtained was 34.9 mW cm⁻², at a POM/MeOH flow rate of 90 ml/min, cathode temperature 70° C., and anode temperature 60° C.

EXAMPLE 2

Experiments were carried out in a 2.5×2.5 cm² graphite composite single cell. The anode flow field was parallel. The membrane electrode assembly (E-Tek series 12D-W ½) in these experiments comprised 100 pores per inch (ppi) reticulated vitreous carbon (RVC) at the cathode and Nafion 117 at the anode.

The membrane electrode assembly was conditioned in the fuel cell. Deionised water at room temperature water was flowed past the anode at a rate of 2 ml min⁻¹ for one hour.

1M methanol was added to 0.3M polyoxometallate (POM) and the solution was heated to 80° C. in the aerator. No anolyte was used. The POM/MeOH flow rate was set at 90 ml min⁻¹ and air flow was set at 0.5 l min⁻¹. Polarisation was obtained. The cathode temperature was recorded.

Figure 3:
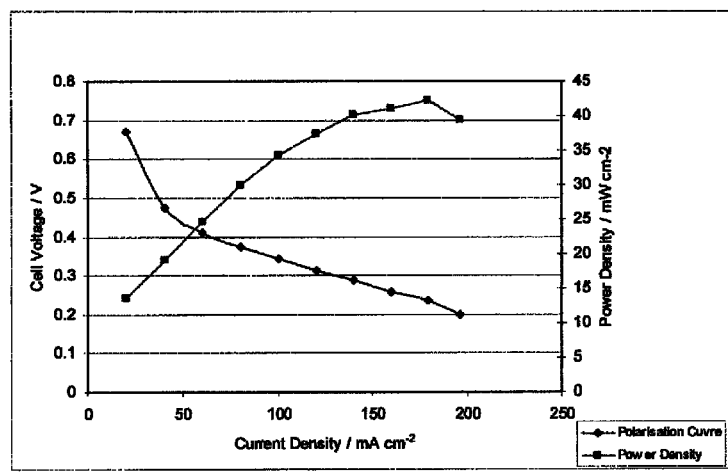
FIG. 3 shows the polarisation and power density curves of a fuel cell in accordance with the invention and described in Example 2 using 0.3M POM containing 1M methanol (90 ml/min$^{-1}$) at 80° C. at the cathode and no anolyte.

FIG. 3 shows the current potential curve and power density data obtained for this system. The peak power obtained was 42.1 mW cm⁻², at a POM/MeOH flow rate of 90 ml/min, cathode temperature 70° C.

EXAMPLE 3

Experiments were carried out in a 2.5×2.5 cm² graphite composite single cell. The anode flow field was parallel. The membrane electrode assembly (E-Tek series 12D-W ½) in these experiments comprised 100 pores per inch (ppi) reticulated vitreous carbon (RVC) at the cathode and Nafion 117 at the anode.

The membrane electrode assembly was conditioned in the fuel cell. Deionised water at room temperature water was flowed past the anode at a rate of 2 ml min⁻¹ for one hour.

2M methanol was added to 0.3M polyoxometallate (POM) and the solution was heated to 80° C. in the aerator. No anolyte was used. The POM/MeOH flow rate was set at 90 ml min⁻¹ and air flow was set at 0.5 l min⁻¹. Polarisation was obtained. The cathode temperature was recorded.

Figure 4:
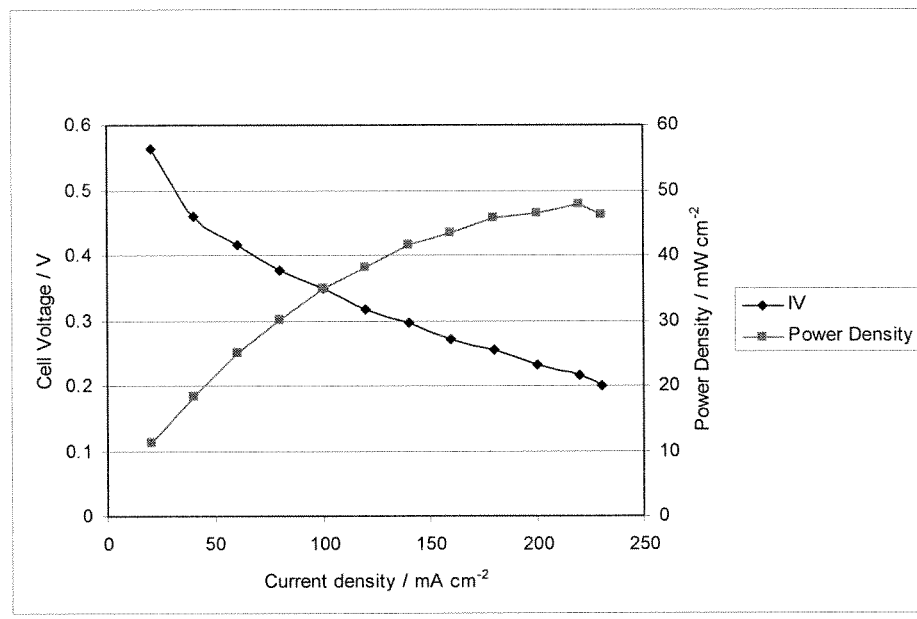
FIG. 4 shows the polarisation and power density curves of a fuel cell in accordance with the invention and described in Example 3 using 0.3M POM containing 2M methanol (90 ml/min$^{-1}$) at 80° C. at the cathode and no anolyte.

FIG. 4 shows the current potential curve and power density data obtained for this system. The peak power obtained was 47.7 mW cm⁻², at a POM/MeOH flow rate of 90 ml/min, cathode temperature 70° C.

The invention claimed is:

1. A fuel cell comprising:
   a cathode in a cathode region of the cell and an anode in an anode region of the cell, the cathode being separated from the anode by an ion selective polymer electrolyte membrane, the cathode region of the cell being supplied in use thereof with an oxidant and a liquid low molecular weight fuel;
   wherein at least some of the liquid low molecular weight fuel in use crosses the polymer electrolyte membrane to supply the anode region of the cell with liquid low molecular weight fuel; and
   an electrical circuit between the cathode and the anode.

2. A fuel cell according to claim 1, wherein the anode region of the cell is supplied with water.

3. A fuel cell according to claim 1, wherein the liquid low molecular weight fuel comprises at least one low molecular weight alcohol.

4. A fuel cell according to claim 3, wherein the low molecular weight fuel is selected from the group consisting of: methanol, ethanol, propanol, isopropanol and butanol, dipropylene glycol and ethylene glycol, and mixtures of two or more thereof.

5. A fuel cell according to claim 1, wherein the operating temperature of the fuel cell is below 100° C.

6. A fuel cell according to claim 1, wherein the cathode region of the cell comprises a non-volatile catholyte solution in flowing fluid communication with the cathode, the catholyte solution comprising a redox couple, wherein the redox couple is at least partially reduced at the cathode in operation of the cell, and at least partially re-generated by reaction with the oxidant after such reduction at the cathode.

7. A fuel cell according to claim 6, additionally comprising at least one of a redox catalyst, a redox mediator and the redox couple acting as at least one of a redox catalyst and a redox mediator in the cathode region of the cell.

8. A fuel cell according to claim 6, wherein at least one of the redox couple, the redox catalyst, and the redox mediator comprises at least one transition metal complex.

9. A fuel cell according to claim 8, wherein at least one of the redox couple, the redox catalyst, and the redox mediator comprises a polyoxometallate species.

10. A fuel cell according to claim 8, wherein at least one of the redox couple, the redox catalyst, and the redox mediator comprises a modified ferrocene species.

11. A fuel cell according to claim 6, wherein the concentration of the redox couple in the catholyte solution is at least about 0.1 M.

12. A fuel cell according to claim 6, wherein the cathode region of the cell is provided with a reservoir for storing the catholyte solution.

13. A fuel cell according to claim 9, wherein the polyoxometallate is represented by the formula:

$X_a[Z_bM_cO_d]$ wherein:
- X is selected from the group consisting of: hydrogen, alkali metals, alkaline earth metals, ammonium, and combinations of two or more thereof;
- Z is selected from the group consisting of: B, P, S, As, Si, Ge, Ni, Rh, Sn, Al, Cu, I, Br, F, Fe, Co, Cr, Zn, $H_2$, Te, Mn, Se, and combinations of two or more thereof;
- M is a metal selected from the group consisting of: Mo, W, V, Nb, Ta, Mn, Fe, Co, Cr, Ni, Zn, Rh, Ru, Tl, Al, Ga, In, metals selected from the 1st, $2^{nd}$, and 3rd transition metal series, metals selected from the lanthanide series, and combinations of two or more thereof;
- a is a number of X necessary to charge balance the $[M_cO_d]$ anion;
- b is from 0 to 20;
- c is from 1 to 40; and
- d is from 1 to 180.

14. A fuel cell according to claim 13, wherein b is from 0 to 2.

15. A fuel cell according to claim 13, wherein M is selected from the group consisting of: vanadium, molybdenum, and combinations thereof.

16. A fuel cell according to claim 13, wherein Z is phosphorus.

17. A fuel cell according to claim 13, wherein X comprises a combination of hydrogen with alkali metal ions and/or alkaline earth metal ions.

18. A fuel cell according to claim 9, wherein the polyoxometallate comprises one of molybdophosphoric acid ($H_3PMo_{12}O_{40}$) and molybdovanadophosphoric acid ($H_5PMo_{10}V_2O_{40}$).

19. A method of generating electricity by the fuel cell of claim 1, comprising:
- supplying the alcoholic fuel to the anode region;
- supplying the oxidant to the cathode region; and
- generating electricity through the electrical circuit between the anode and the cathode.

* * * * *